United States Patent [19]
Schroder

[11] 4,315,949
[45] Feb. 16, 1982

[54] PROCESS FOR MAKING A MILK PROTEIN DIGESTION PRODUCT AND FOODSTUFFS COMPRISING SAME

[75] Inventor: Karl Schroder, Reitmehring, Fed. Rep. of Germany

[73] Assignee: Meggle Milchindustrie GmbH & Co. KG, Reitmehring, Fed. Rep. of Germany

[21] Appl. No.: 941,833

[22] Filed: Sep. 11, 1978

[30] Foreign Application Priority Data

Sep. 19, 1977 [DE] Fed. Rep. of Germany ....... 2742083

[51] Int. Cl.³ .......................... A23C 23/00; A23J 3/02; A23P 1/00
[52] U.S. Cl. .................................. 426/334; 426/448; 426/456; 426/512; 426/516; 426/564; 426/580; 426/657
[58] Field of Search ..................... 426/330.2, 334, 564, 426/580, 583, 657, 448, 456, 512, 516, 518

[56] References Cited

U.S. PATENT DOCUMENTS

| 3,917,876 | 11/1975 | Harwood et al. | 426/657 X |
| 3,958,032 | 5/1976 | Merriam | 426/580 |
| 3,962,481 | 6/1976 | Kumar | 426/657 X |
| 3,978,244 | 8/1976 | Sair | 426/580 |
| 4,016,298 | 4/1977 | Kasik et al. | 426/657 X |
| 4,031,254 | 6/1977 | Kasik et al. | 426/657 X |
| 4,031,267 | 6/1977 | Berry et al. | 426/657 X |

Primary Examiner—Arthur L. Corbin
Attorney, Agent, or Firm—Sprung, Felfe, Horn, Lynch & Kramer

[57] ABSTRACT

Process for the production of a milk protein digestion product which process comprises passing, at elevated pressure and temperature, a mixture of milk protein, at least one digestion agent, water and a composition, which liberates an inert gas at said elevated pressure and temperature, through an extruder and allowing the product to expand freely at the outlet thereof to give a foamed form-stable extrudate with a specific weight up to 0.4 g./cm³.

14 Claims, No Drawings

PROCESS FOR MAKING A MILK PROTEIN DIGESTION PRODUCT AND FOODSTUFFS COMPRISING SAME

The present invention is concerned with a process for the production of a milk protein digestion product, with the use of the product obtained, and foodstuffs containing such milk protein digestion products.

Digested milk proteins are generally produced from casein by reaction with solubilizing agents, corresponding soluble adducts thereby being formed. The previously known processes can be essentially summarized and categorized as follows into two groups:

1. Spray processes.

The spray processes have the advantage that low temperatures can be employed. Since higher temperatures can impair the color and flavor properties of the casein, in this way a product is obtained with little change of color and flavor properties. However, a disadvantage of this process is that light, very voluminous fluffy particles with low bulk densities of about 0.2 to 0.3 are obtained. Furthermore, the production costs are high since, in the case of spray processes, only pure solutions can be employed and even at a casein content of about 20 to 25% by weight, the viscosity limit is reached at which the solutions can still be sprayed. Therefore, 75 to 80% of the water must be removed, which gives rise to high energy costs.

2. Roller processes.

In the case of drying on rollers, relatively compact particles are obtained with a two to threefold bulk density (about 0.4 to 0.6, compared with the particles obtained by the spray process). The main disadvantage of the roller processes is that discoloration and impairment of flavor easily occur and there is a great danger of resinification. Furthermore, in the case of the usual roller drying processes, a substantially dissolved product must be used. Recently described roller drying processes are said to give satisfactory results with swollen protein and dissolved alkali. However, our own experiments have shown that here the disadvantages caused by the high temperatures appear even more markedly and, furthermore, the digestion is difficult to control so that the homogeneity of the product frequently leaves something to be desired. Attempts have already been made to improve the homogeneity in the case of this process by the blowing in of steam. However, the disadvantage of temperature sensitivity cannot be overcome since this depends essentially upon the fact that the action of the temperature lasts a relatively long time and the danger of heat damaging is greater than in the case of a drying in a relatively short time, such as in the case of the spray processes.

Finally, moist casein mixed with sodium carbonate has also been applied directly to the drying rollers. A reaction is thereby said to be brought about at relatively low temperatures but a product is obtained with an undesirably high water content. If the drum temperature is increased to such an extent that the desired degree of dryness is achieved, then the above-described difficulties again occur. Furthermore, in the case of this process, a product is obtained in the form of flocks which, for the achievement of the desired high bulk density, must still be ground. Nothing is known regarding the achievable homogeneity. As starting material, there is employed a casein with a water content of about 60% by weight so that a considerable amount of water must also be removed. This also applies to the above-mentioned modern roller processes.

German Patent Specification No. 2,343,830 describes the conversion of a protein-containing material by mechanical temperature and pressure action, for example in an extruder, under non-expanding conditions, into a dense glass-like product. Warning is given against using conditions such that expansion takes place due to the steam formed when extruding the moist material. However, such an expansion by steam requires the use of high temperatures which are especially harmful when the product is already quite dry.

The present invention enables carrying out the digestion of milk protein under conditions which permit the use of a protein which is as dry as possible as starting material and thus permit the amount of water to be removed to be kept to a minimum while, at the same time, avoiding heat damage and especially resinification which hitherto regularly occurred when a protein with very low water content is dried and is subjected to the high temperatures which are necessary for this purpose. In spite of the relatively low extrusion temperatures which avoid heat damage, an absolutely homogeneous product is obtained. Thus, there are to be fulfilled the requirements which, according to the previous state of the art, cannot be combined with one another. Furthermore, it is possible to apply the process to commercially available acid casein without any kind of pre-treatment.

The process of the present invention for the production of a milk protein digestion product with the use of pressure and temperature comprises passing a mixture of milk protein, at least one digestion agent, water, a substance or mixture which liberates an inert gas under extruder pressure and temperatures, and optionally at least one flavor forming foodstuff through an extruder at an elevated temperature and allowing the same to expand freely at the outlet thereof to give a foamed, form-stable extrudate with a specific weight of at most 0.4 g./cm$^3$, which if desired, is subsequently dried and/or comminuted. The milk protein, e.g., casein, can be mixed with the digestion agent and an edible acid first, whereafter the gas-producing substance is added thereto.

The water content before the extruding depends upon the type of extruder used and upon the extrusion process and is preferably 13 to 27% by weight and especially 17 to 22% by weight. The temperature of the product in the extruder is preferably from 80° to 160° C., depending upon the water content. The lower the water content, the higher the temperature which can be maintained without damaging the product. In borderline cases, it is also possible to go below or above the stated temperature limits without causing damage to the product.

The substances and substance mixtures which liberate an inert gas under the pressure and temperature conditions of an extruder include those which liberate, for example, nitrogen, hydrogen, di-nitrogen-monoxide, rare gases or carbon dioxide, carbon dioxide-liberating substances, especially the alkali metal and alkaline earth metal carbonates and bicarbonates being preferred, together with edible acids or acidic compounds, such as edible acidic phosphates and/or citrates.

The present invention depends upon the surprising discovery of the fact that when the extruded mixture is foamed up by inert gas, this inert gas exercises a protective gas action upon the milk protein or the product resulting therefrom and thus minimizes heat damage, which had previously been held to be unavoidable in the case of comparable temperature and moisture conditions and which also occur in the case of a foaming by steam.

If, in the process of the present invention, the starting material used is acid casein with a pH value of about 4.5, then, as a rule, it is possible to employ those inert gas-forming substances which liberate a gas under these pH value conditions. The alkali metal and alkaline earth metal carbonates and bicarbonates are especially useful for this purpose.

If, instead of acid casein, rennet casein is used, then, in addition to the digestion agent, an edible acid is preferably added in order to bring about the gas evolution. For this purpose, it is preferable to employ the acids of those salts which are, for example, usually employed in the production of processed cheese, such as acid polyphosphates (preferably in aqueous solution) or citric acid. In the case of this embodiment of the process according to the present invention, it is preferable first to mix the rennet casein with the acid solution and, after adsorption of the acid has taken place, the inert gas-liberating substance, preferably an alkali metal carbonate, is admixed therewith and the mixture fed into the extruder.

It is also possible to employ mixtures of casein with other proteins, for example the so-called coprecipitate, which is a mixture of casein and, whey protein. When using coprecipitate, the procedure corresponds to that described above for rennet casein. Other proteins which are also obtained by acid precipitation can be employed in the process according to the present invention.

It is important for the process of the present invention that the mixture is subjected to the typical mechanical pressure, temperature and time conditions which are present in conventional extruders, for example in synthetic resin extruders. Under the conditions used according to the present invention, the milk protein behaves like a thermoplast, a completely homogeneous, semi-transparent mass being obtained which makes it possible to omit the use of lubricants. Due to the extremely short residence time in the extruder, the period of action of the temperature prevailing therein is very short so that the protective gas effect is completely effective.

According to the process of the present invention, an aqueous solution of the inert gas-forming substance can be added to the dry milk protein. However, if desired, it is also possible to dry mix milk protein and the inert gas-forming substance and then to add the necessary amount of water before or during the actual extruding treatment. The water can thereby be added not only in liquid form but also in vapour form. However, it is important that a minimum amount of water is available in order to bring about the inert gas evolution. The water content in dry acid casein of about 6 to 10% by weight is not sufficient for the process of the present invention.

The digestion agents which can be used according to the present invention include the above-mentioned substances or substance combinations employed for the liberation of inert gas. In general, for this purpose, there can be used, for example, alkaline-reacting salts and/or hydroxides which can convert the insoluble proteins present in the acid form into their corresponding soluble salt form, as well as salts, the anion of which is able to convert insoluble protein cation complexes of polyvalent metals into soluble form by complex formation, examples of such salts including oligo- and polyphosphates and citrates. There can also be used combinations of substances which together are able to digest the protein according to the above-given principles.

The product obtained by the process according to the present invention, which expands at the outlet of the extruder mouth piece, is a well-structured, porous, homogeneous product which is form-stable in a dry state and which, after cooling, can be finely ground with low energy expenditure and thus possesses a very brittle consistency. It can be used or further worked up not only in an unground state but after a grinding. If desired, the product can subsequently be dried.

If the product is used directly without grinding, then it can be used, for example, for the production of processed cheese, as well as for other purposes in which digested milk protein has previously been employed in powder form. This previously employed powder form gave rise to dust problems. Furthermore the powder was difficult to moisten, in contradistinction to the unground product of the present invention. Comminution to give granulates results, in contradistinction to the conventional roller product, in a readily soluble product.

Depending upon the temperature employed for the extruding, the product obtained has more or less the character of a baked product. Especially when using higher temperatures in the given range, products are obtained with a snack-like character which can be used directly as foodstuffs. However, even in the case of the lowest temperatures which can be used according to the present invention, crispy products are obtained, provided that the water content of the end product is low enough.

In the case of direct use as a foodstuff and especially as a kind of snack, the casein used can first be mixed with flavor-forming foodstuffs or additives, for example, carbohydrates (sugar and the like), salts, spices and the like. However, if desired, flavoring and aroma components can also be added to the finished product, for example in the form of coatings or coverings, in compact or particle-like form. When adding carbohydrates to the starting material, the low temperature stressing acts, as a result of the protective gas effect and of the short residence time, especially advantageously since the Maillard reaction is suppressed.

The addition material used can also include vitamins and other conventional foodstuff additives.

If the product of the process according to the present invention is ground, then a drying step can also be included, a powdery digestion product with high bulk density thereby being obtained.

When carrying out the process of the present invention, the product is, surprisingly, substantially deodorized. This is of special importance in the case of pure caseinate which possesses a somewhat unpleasant odor. The deodorizing may possibly be due to the expulsion of the undesirable odor components by the protective gas formed in statu nascendi.

Furthermore, it is noteworthy that the semi-transparent product obtained according to the process of the present invention is, in the case of caseinate, not resinified and remains readily soluble, which in particular, guarantees the typical caseinate properties.

The inert gas-forming material must be employed in such an amount that the resulting product, before grinding, has a specific weight below 0.4 and preferably below 0.3, the specific weight hereby being understood to mean the ratio of weight to external volume and thus taking into account the hollow spaces.

The extruder used can be any commercially available device which imparts to the material within the extruder a temperature in the above-given range.

The following Examples 1 to 4 and 6 to 8 are given for the purpose of illustrating the present invention, Example 5 being given for the purpose of comparison:

EXAMPLE 1.

100 kg. Fine-grained acid casein (9.0% by weight water content) were mixed with 17 kg. of a 17.65% aqueous sodium carbonate solution. The initially somewhat moist appearing product had, after a few minutes, a dry powdery to crumbly character with satisfactory flow properties. The water content of this mixture was 19.7% by weight.

The mixed product was worked up in an extruder under the following conditions:
extruder type: foodstuff extruder with groove "Brabender DN20"
screw-compression ratio: 4:1
extruder head: 3 mm. round nozzle
speed of rotation: 150 r.p.m.
moment of rotation: 6000 mp
mass temperature on the head: 96° C.
mass pressure on the head: about 35 bar.

In the nozzle, the extruded product had a plastic character (similar to a thermoplastic synthetic resin in a warm state). Shortly after emergence from the nozzle head, it expanded to about ten times the original volume (3 to 5 times the nozzle diameter). After brief drying and cooling, the extrudate had a solid, foamy, crispy, snack-like structure.

Analysis of the product:
water content: 8.0 by weight
protein content: 86% by weight
density: 0.11 g./ml.
pH: 6.8

EXAMPLE 2.

The composition of the starting mixture and the carrying out of the process were analogous to Example 1 but with a higher mass temperature and the following data:
water content: 19.7% by weight
mass temperature: 116° C.
mass pressure: about 40 bar
moment of rotation: 4800 g/m The extruding procedure and the foaming (expanding) showed no visible deviation from Example 1. In appearance and structure, the foamed product obtained resembled the expanded product of Example 1.

Analysis of the product:
water content: 8.4% by weight
protein content: 86% by weight
density: 0.13 g./ml.
pH: 6.9

EXAMPLE 3.

The starting conditions and the process were analogous to those of Example 1 but with the following changed extruder data:
mass temperature: 118° C.
moment of rotation: 4300 g./m.

In appearance and structure, the foamed end product resembled the product of Example 1 except that the volume increase is somewhat smaller than in Examples 1 and 2.

Analysis of the product:
water content: 8.5% by weight
protein content: 86.2% by weight
density g./l.: 0.2 g./ml.
pH: 7.0

EXAMPLE 4.

100 kg. Fine-grained acid casein with a water content of 9.3% by weight were mixed with 14 kg. of a 20% aqueous sodium carbonate solution. A powdery mixed product was obtained with a water content of 18.0% by weight. The product was treated in a foodstuff extruder under the following conditions:
foodstuff extruder with groove
screw-compression ratio: 4:1
extruder head: 3 mm. round nozzle
speed of rotation: 100 r.p.m.
moment of rotation: 4900 mp
mass temperature: 96° C.

After emergence from the nozzle, the protein foamed up strongly, a 10 fold volume increase thereby being achieved. The end product had properties similar to those of the product of Example 1.

Analysis of the product:
water content: 9.8% by weight
protein content: 85% by weight
density: 0.12 g./l.
pH: 6.7

EXAMPLE 5 (comparison)

95 kg. Fine-grained acid casein with a water content of 9.0% by weight were mixed with 40.6 g. of a solution with the following composition:
water: 90.1% by weight
sodium bicarbonate: 4.9% by weight
trisodium citrate: 2.3% by weight
sodium carbonate: 2.7% by weight The mixture then had a water content of 27.0% by weight. The initially somewhat sticky product was, after about 10 minutes, due to water binding so dry that it could be worked up without difficulty in an extruder under the following conditions:
extruder type: foodstuff extruder with groove
screw-compression ratio: 4:1
extruder head: 3 mm. round nozzle
speed of rotation: 100 r.p.m.
moment of rotation: 4900 mp
mass temperature: 96° C.
mass pressure: 32 bar.

In the nozzle, the extruded mass had a plastic character but, upon decompression, expanded very little. The cooled, solid product had a comparatively high density, was hard but not brittle and was difficult to grind.

Analysis of the product:
water content: 10.6% by weight
protein content: 85% by weight
density: 0.46 g./ml.
pH: 6.5

EXAMPLE 6.

95 kg. Commercially available acid casein with a water content of 9.0% by weight was mixed with 25 kg. of a solution with the following composition:
84.03% by weight water
7.88% by weight sodium bicarbonate
3.68% by weight trisodium citrate 4.41% by weight sodium carbonate.

The resultant mixture had a water content of 24.6% by weight. The initially still moist product was, after about 10 minutes, without subsequent drying, powdery to crumbly and could be readily extruded under the following conditions:
extruder type: foodstuff extruder with groove
screw-compression ratio: 4:1
extruder head: 3 mm. round nozzle
speed of rotation: 100 r.p.m.
moment of rotation: 3000 g./m.
mass temperature on the head: 94° C.
mass pressure: about 37 bar.

In the nozzle, the extrudate was like a molten plastic and foamed shortly after emergence from the nozzle head, the volume increase not being as great as in Examples 1 to 4.
Analysis of the product:
water content: 8.0% by weight
protein content: 86.5% by weight
density: 0.32 g./ml.
pH: 7.1

EXAMPLE 7.

The batch corresponded to that in Example 4 with an 18.0% by weight water content in the mixed product. However, extrusion took place in a synthetic resin extruder under the following conditions:
extruder type: smooth synthetic resin extruder (without groove)
screw-compression ratio: 2:1
screw diameter: 30 mm.
extruder head: round strand 3 mm. diameter
speed of rotation: 100 r.p.m.
moment of rotation: 150–200 (NM), mp
mass pressure on the nozzle: 64 bar
mass temperature:
  zone 1: 80° C.
  zone 2: 115° C.
  zone 3: 115° C.
  zone 4: 120° C.
  nozzle: 120° C.
screw back force: 1000–1100 kp
discharge: 155 g./min.

In spite of the absence of a guide groove in the extruder tube, the extrusion process could be carried out for as long as desired without difficulty. The appearance and properties of the foamed product were similar to those of the product obtained in Example 1, no subsequent drying being necessary.
Analysis of the foamed product:
water content: 9.5% by weight
protein content: 85% by weight
density: 0.28 g./ml.
pH: 6.7

EXAMPLE 8.

100 kg. Commercially-available acid casein were mixed with 3 kg. sodium carbonate and with such an amount of water that the mixture obtained had a water content of 22% by weight. The mixture was extruded as in Example 7, using a synthetic resin extruder. In the following, there are given the data which differ from the data in Example 7:
speed of rotation: 120 r.p.m.
moment of rotation: 100 to 150 mp
mass pressure on the nozzle: 50 bar
screw back force: 950 to 1000 kp
discharge: 210 g./min.

Extruding and foaming took place just as easily as in Example 7. The foamed protein product obtained did not differ visually from the end product obtained in Example 1. Here, too, no subsequent drying was necessary.
Analysis of the product:
water content: 8.0% by weight
protein content: 87% by weight
density: 0.30 g./ml.
pH: 6.8

EXAMPLE 9

26 kg. washed acid casein curd containing 50% by weight of dry matter and 60 kg. fine-grained acid casein containing 93% by weight of dry matter were intimately mixed. 3.3 kg. dry sodium bicarbonate were mixed into this mixture, as well as 20 kg. maize flour containing 85% by weight of dry matter. The final water content of the mixture was 19% by weight.

The mixture was worked up in an extruder as in the preceding Examples, under the following conditions: screw compression ratio 4:1, 3 mm. round nozzle, temperature adjustment first zone 100° C., second zone and third zone 165° C. The extrusion mass had a temperature of 157° C. There was obtained a solid, foamy, crispy, snack-like mass with a density of 0.18 g./ml. and a pH value of 6.3.

EXAMPLE 10

95 kg. commercially-available acid casein with a water content of 9% by weight was adjusted to a water content of 16% by weight with an aqueous solution of potassium carbonate, 2.5 g. potassium carbonate being added per 100 g. of acid casein. To this mixture were added 2 kg. finely ground sodium chloride, 0.5 kg. glutamate and 0.7 kg. cheese aroma of the Swiss gruyere type, the resultant mixture then being intensively mixed up. The mass was extruded in the same way as above, an exit temperature of 120° C. being maintained. The product could be very readily extruded and had the desired porous, crispy character. The density of the product was 0.3 g./ml. Flavor assessment: in the case of sensory investigation, the product was adjudged to be piquant and had no after-taste.

It will be understood that the specification and examples are illustrative but not limitative of the present invention and that other embodiments with the spirit and scope of the invention will suggest themselves to those skilled in the art.

What is claimed is:

1. Process for the production of a milk protein digestion product which process comprises passing, at elevated pressure and temperature, a mixture of casein-containing milk protein, at least one digestion agent, water and a composition, which liberates an inert gas at said elevated pressure and temperature, through an extruder and allowing the product to expand freely at the outlet thereof to give a foamed form-stable extrudate with a specific weight up to 0.4 g./cm$^3$.

2. Process as claimed in claim 1, wherein said mixture also contains at least one flavoring foodstuff.

3. Process as claimed in claim 1, wherein said extrudate is subsequently dried.

4. Process as claimed in claim 1, wherein said extrudate is subsequently comminuted.

5. Process as claimed in claim 1, wherein the mixture contains 13 to 27% by weight of water before extruding.

6. Process as claimed in claim 1, wherein the mixture contains 17 to 22% by weight of water before extruding.

7. Process as claimed in claim 1, wherein said mixture is heated to temperatures between 80° and 160° C. in the extruder.

8. Process as claimed in claim 1, wherein acid casein or rennet casein is used as the milk protein.

9. Process as claimed in claim 8, wherein rennet casein, the digestion agent and an edible acid are mixed, whereafter the gas-producing substance is added thereto.

10. Process as claimed in claim 1, wherein an alkali metal or alkaline earth metal carbonate or bicarbonate is employed as the gas-liberating composition and as the digestion agent.

11. Process as claimed in claim 1, wherein, as the inert gas-liberating composition there is employed a compound of carbonic acid together with an edible acid or acidic compound.

12. Process as claimed in claim 11, wherein at least one of an edible acidic phosphate and citrate is employed in combination with an alkali metal or alkaline earth metal carbonate.

13. Process as claimed in claim 1, wherein at least one of a flavor-forming foodstuff and additive is added before extrusion.

14. Process as claimed in claim 1, wherein at least one of a flavor-forming foodstuff and additive is added after extrusion.

* * * * *